US012638976B2

(12) United States Patent
Ruggeri et al.

(10) Patent No.: US 12,638,976 B2
(45) Date of Patent: May 26, 2026

(54) MANAGED NON-VOLATILE MEMORY DEVICE WITH DATA VERIFICATION

(71) Applicant: Micron Technology, Inc., Boise, ID (US)

(72) Inventors: Daniela Ruggeri, Torre del Greco (IT); Fabrizio Fiorenza, Giugliano in Campania (IT); Marco Redaelli, Munich (DE); Francesco Lupo, Munich (DE)

(73) Assignee: Micron Technology, Inc., Boise, ID (US)

( * ) Notice: Subject to any disclaimer, the term of this patent is extended or adjusted under 35 U.S.C. 154(b) by 78 days.

(21) Appl. No.: 18/644,821

(22) Filed: Apr. 24, 2024

(65) Prior Publication Data

US 2024/0354005 A1      Oct. 24, 2024

Related U.S. Application Data

(60) Provisional application No. 63/461,455, filed on Apr. 24, 2023.

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | | |
|---|---|---|---|---|
| 5,974,499 | A * | 10/1999 | Norman ................. | G11C 16/10 |
| | | | | 711/103 |
| 6,625,688 | B1 * | 9/2003 | Fruehling ........... | G06F 11/2236 |
| | | | | 714/732 |
| 2017/0024428 | A1 | 1/2017 | Patiejunas et al. | |
| 2018/0083651 | A1 * | 3/2018 | Song ................... | H03M 13/095 |
| 2020/0097194 | A1 | 3/2020 | Grosz | |
| 2020/0285628 | A1 | 9/2020 | Honda | |
| 2022/0035700 | A1 | 2/2022 | Schuh | |
| 2022/0066880 | A1 * | 3/2022 | Breen ................. | G06F 11/1048 |
| 2022/0156143 | A1 | 5/2022 | Zamir et al. | |

OTHER PUBLICATIONS

"International Application Serial No. PCT US2024 026030, International Search Report mailed Aug. 14, 2024", 3 pages.
"International Application Serial No. PCT US2024 026030, Written Opinion mailed Aug. 14, 2024", 4 pages.
Swissbit, "Swissbit EM 20 e MMC Production State Awareness PSA WhitePaper", Revision 1.0, (Jun. 16, 2017), 7 pages.

* cited by examiner

*Primary Examiner* — Larry T Mackall
(74) *Attorney, Agent, or Firm* — Schwegman Lundberg & Woessner, P.A.

(57) ABSTRACT

Various examples are directed to systems and methods involving a managed NAND non-volatile memory device comprising a memory array and a memory controller. The memory controller may receive a verification request from a requesting device, the verification request comprising an indication of a first portion of the memory array, and a first known check value. The memory controller may apply an operation based at least in part on first data from the first portion of the memory array to generate a calculated check value and determine verification result data based at least in part on the first known check value and the calculated check value.

20 Claims, 13 Drawing Sheets

300

1100

1102 — HOST DEVICE INITIALIZES PRODUCTION STATE

1104 — HOST DEVICE SETS PRELOADING DATA SIZE

1106 — HOST DEVICE MAKES PRODUCTION STATE PRELOADED DATA

1108 — PA WRITES PRELOADED DATA TO MEMORY DEVICE

1110 — HOST DEVICE MAKES PRODUCTION STATE PRELOAD POST WRITE

1112 — MEMORY DEVICE PERFORMS VERIFICATION CHECK

1114 — MEMORY DEVICE LOADED

1116 — HOST DEVICE MAKES PRODUCTION STATE NORMAL

1200

1202 — HOST DEVICE INITIALIZES PRODUCTION STATE

1204 — HOST DEVICE SETS PRELOADING DATA SIZE

1206 — HOST DEVICE MAKES PRODUCTION STATE AUTOMATED

1208 — PA WRITES PRELOADED DATA TO MEMORY DEVICE

1210 — MEMORY DEVICE PERFORMS VERIFICATION CHECK

1212 — MEMORY DEVICE LOADED

MANAGED NON-VOLATILE MEMORY DEVICE WITH DATA VERIFICATION

This application claims the benefit of priority to U.S. Provisional Application Ser. No. 63/461,455, filed Apr. 24, 2023, which is incorporated herein by reference in its entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states.

For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quadlevel cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of memory cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded" and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
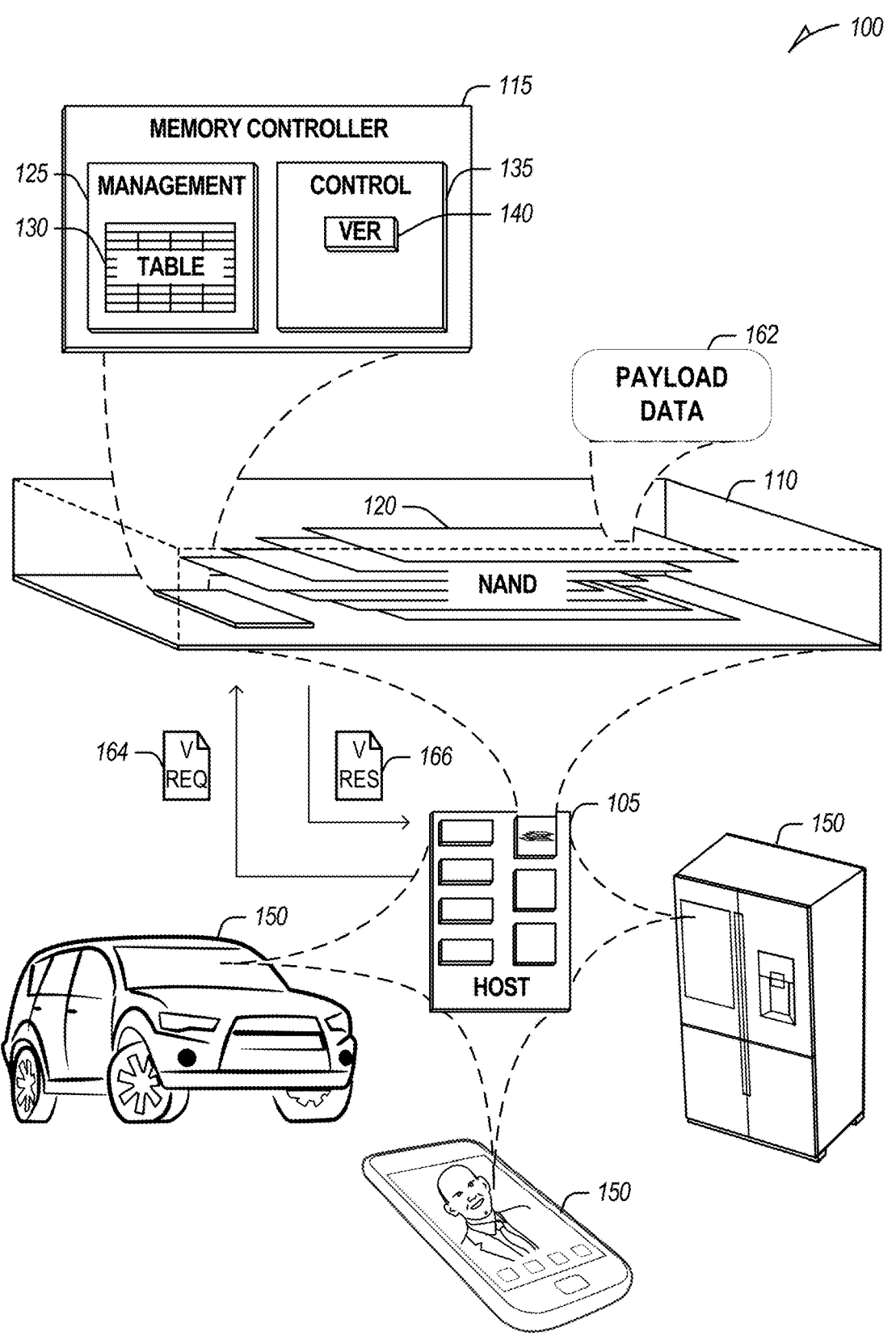
FIG. 1 illustrates an example of an environment including a memory device.

Various examples described herein are directed to managed NAND memory devices configured to perform data verification. An electronic device arrangement may include a host device and a memory device, such as a managed NAND memory device. The memory device stores data that is used by the host device during operation of the host device. The stored data, also referred to herein as payload data, may be provided to the memory device by the host device. In some examples, some or all of the payload data is provided to the memory device by a programming appliance, for example, before the memory device is installed to the electronic device.

Payload data stored at the memory device may sometimes be at risk of corruption. For example, the process of communicating the stored data to the memory device, from the host device and/or from a programming appliance, may result in a loss of data integrity. Before the host device relies on stored data stored at the memory device, it is sometimes desirable for the host device to verify the integrity of the stored data stored at the memory device.

Various different verification techniques may be used to verify stored data stored at the memory device. One example is a Cyclic Redundancy Check (CRC) technique utilizing check values. A check value is a value obtained by applying a mathematical operation to stored data. In some examples, a check value may be obtained by performing a polynomial division of the stored data. The check value may be, or be derived from, a remainder of the polynomial division.

Stored data stored at the memory device may be associated with a known check value. The known check value may be calculated by a programming appliance, the host device, and/or another component. To verify the stored data, stored data may be read from a memory array of the memory device. The mathematical operation may be performed on the read stored data to determine a calculated check value. If the calculated check value matches the known check value, then the stored data is verified. If the calculated check value does not match the known check value, then the stored data is not verified. When the calculated check value does not match the known check value it may indicate that the stored data has been corrupted since the known check value is determined.

Performing data verification involves accessing the stored data and processing the stored data to execute the mathematical operation. In the context of an electronic device comprising a host device and a memory device, this often includes loading the stored data from the memory device to the host device. The host device may apply the mathematical operation to the stored data to determine the calculated check value and perform the comparison between the calculated check value and the known check value. This arrangement, however, presents certain disadvantages. For example, loading data from the memory device to the host device may be time-consuming and may also consume bus and/or other communication resources between the memory controller and the host device.

Similar challenges may arise in a manufacturing context when stored data is pre-loaded to a memory device, for example, by a programming appliance. It may be desirable for the payload appliance to verify the integrity of the data written to the memory device. This may include the programming appliance reading back the stored data from the memory device, generating a calculated check value from the read stored data, and comparing the calculated check value to the known check value. Reading the stored data back from the memory device may be time-consuming and error-prone, and may increase the time and expense of manufacture.

Various examples described herein address these and other challenges by providing a memory device comprising a memory array and a memory controller. The memory controller may be programmed to perform data verification, for example, in response to a verification request from a requesting device. For example, instead of providing stored data to a programming appliance or a host device, the memory controller of a memory device may generate a calculated check value for stored data stored at the memory array and compare the calculated check value to a known check value. The memory controller may provide a result of the verification to the host device and/or programming appliance. The requesting device may be a host device and/or a programming appliance.

In this way, the requesting device may not need to read all of the stored data from the memory device in order to verify the stored data. Instead, the requesting device may only receive and/or read verification result data from the memory device.

FIG. 1 illustrates an example of an environment 100 including a host device 105 and a memory device 110 configured to communicate over a communication interface. An electronic device comprising the host device 105 and/or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of 3D NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 1300 of FIG. 13.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., IoT devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, ROM, an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor, or one or more transceiver circuits, etc.

The memory controller 115 can receive instructions from the host device 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host device 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host device 105, or internally generated by the memory manager 125 (e.g., in association with wear leveling, error detection or correction, etc.).

The array controller 135 can include a verification module 140, which can include, among other things, a CRC engine or other circuitry configured to perform stored data verification, for example, as described herein. In some examples, the CRC engine may be implemented in software that is executed by a processor, a microcontroller, or other suitable hardware at the memory controller 115.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable logical states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding SLC NAND flash device. As such, the MLC device may require more metadata bytes for error data than the corresponding SLC device.

The memory controller 115 and memory array 120 can be configured to perform data verification. For example, the host device 105 may provide a verification request 164 to the memory device 110. The verification request 164 may comprise an indication of a portion of the memory array 120 comprising payload data 162 to be verified. The portion of the memory array 120 may comprise a block, page, range of addresses, or any other suitable subdivision of the memory array 120. The verification request 164 may indicate a portion of the memory array in any suitable manner. For example, the verification request 164 may indicate a start address at the memory array 120 and a stop address at the memory array 120. The portion of the memory array 120 may include addresses between the start address and a stop address.

The verification request 164 may also comprise a known check value. The known check value may be a check value that was derived by applying a mathematical operation to the payload data, for example, before the payload data was stored at the memory device 110.

The verification request 164 may be provided according to any suitable communication protocol. In some examples, the verification request 164 may be formatted as a custom or programmable command. For example, where the memory device 110 communicates with the host device 105 via an eMMC™ interface, the verification request 164 may be arranged as a CMD56 command. In another example where the memory device 110 communicates with the host device via a UFS interface, the verification request 164 may be arranged as a vendor-unique (VU) command.

Memory controller 115 may receive the verification request 164. In response to the verification request 164, the memory controller 115 may apply a mathematical operation to the payload data 162 to generate a calculated check value. The mathematical operation applied to generate the calculated check value may be the same mathematical operation that was applied to generate the known check value. In this way, the calculated check value should be the same as the known check value. If there is a difference between the calculated check value and the known check value, it may indicate that the payload data 162 has been corrupted or otherwise changed since the calculation of the known check value. The memory controller 115 may compare the calculated check value to the known check value and generate verification result data 166. The verification result data 166 may comprise an indication of whether the payload data 162 passed the verification.

The memory controller 115 may return the verification result data 166 to the host device 105. In some examples, the memory controller 115 may directly provide the verification result data 166 to the host device 105 as a verification result message transmitted via a communication interface between the memory device 110 in the host device 105. Also, in some examples, the memory controller may return the verification result data 166 to the host device by writing the verification result data 166 to a location at the memory array 120 that is known to the host device 105. Memory controller 115 may provide the host device 105 with an indication that the verification result data is available. In some examples, the memory controller 115 may provide the host device 105 with an address of the location at the memory array storing the verification result data. The host device 105 may then send a read request to obtain the verification result data 166 from the memory array 120.

In some examples, the verification request 164 may omit the known check value. The memory controller 115 may perform the mathematical operation on the payload data 162 to generate a calculated check value. Verification result data 166, then, may comprise an indication of the calculated check value. The host device 105 may compare the calculated check value to the known check value and determine whether the payload data 162 is verified.

Figure 2:
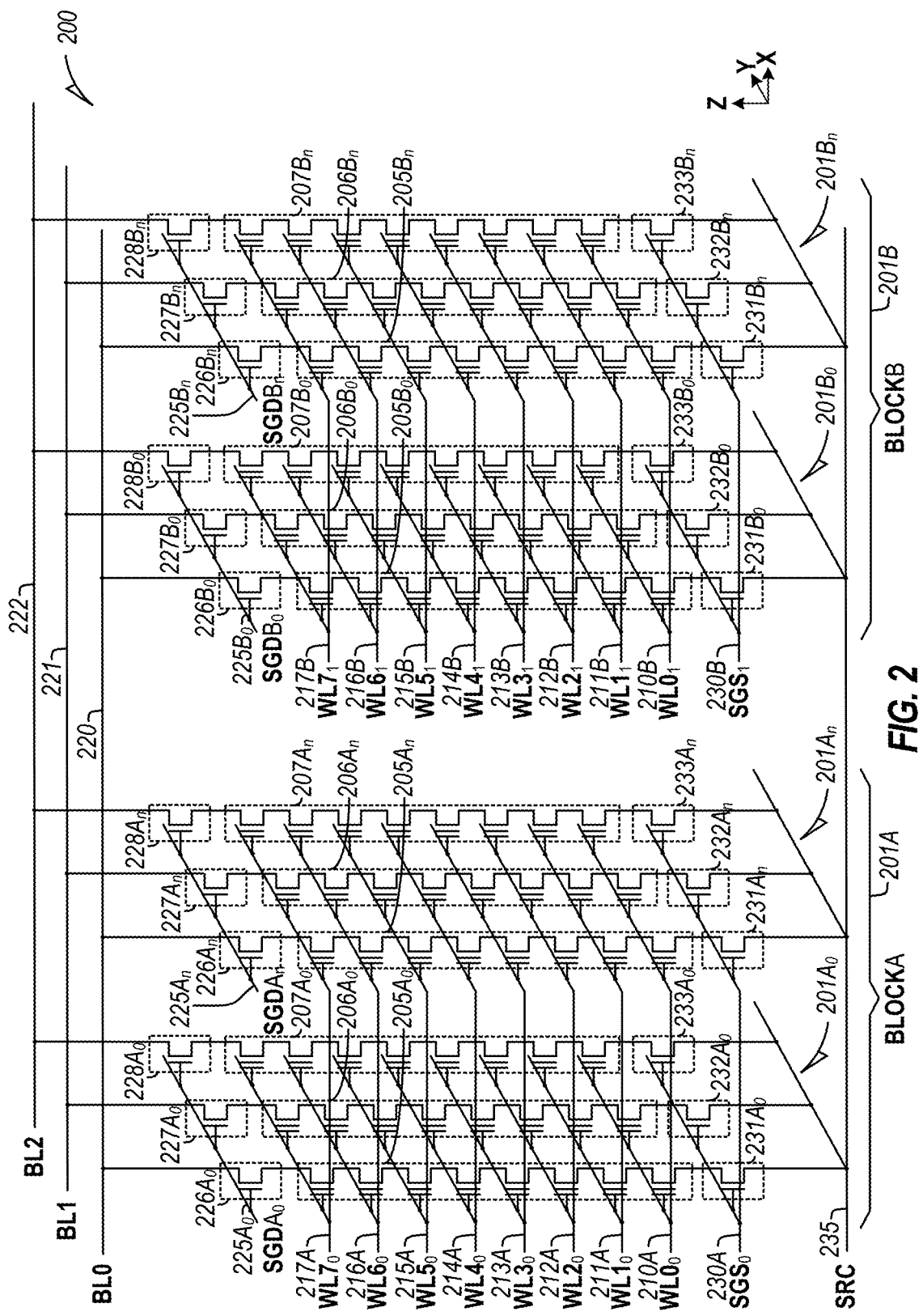
FIGS. 2-3 illustrate schematic diagrams of example NAND architecture semiconductor memory arrays.

FIG. 2 illustrates an example schematic diagram of a 3D NAND architecture semiconductor memory array 200 including a number of strings of memory cells (e.g., first-third $A_0$ memory strings 205$A_0$-207$A_0$, first-third $A_n$ memory strings 205$A_n$-207$A_n$, first-third $B_0$ memory strings 205$B_0$-207$B_0$, first-third $B_n$ memory strings 205$B_n$-207$B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$ 201$B_0$, sub-block $B_n$ 201$B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS 231$A_0$-233$A_0$, first-third $A_n$ SGS 231$A_n$-233$A_n$, first-third $B_0$ SGS 231$B_0$-233$B_0$, first-third Bn SGS 231$B_n$-233$B_n$, etc.) and a drain-side select gate (SGD) (e.g., first-third $A_0$ SGD 226$A_0$-228$A_0$, first-third $A_n$ SGD 226$A_n$-228$A_n$, first-third $B_0$ SGD 226$B_0$-228$B_0$, first-third $B_n$ SGD 226$B_n$-228$B_n$, etc.). Each string of memory cells in the 3D memory array can be arranged along the X direction as data lines (e.g., bit lines-BL0-812 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate coupled to (e.g., electrically or otherwise operatively connected to) an access line (e.g., word lines WL0$_0$-WL7$_0$ 210A-217A, WL0$_1$-WL7$_1$ 210B-217B, etc.), which collectively couples the control gates across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD 226$A_0$-228$A_0$ can be accessed using an $A_0$ SGD line SGDA$_0$ 225$A_0$, first-third $A_n$ SGD 226$A_n$-228$A_n$ can be accessed using an $A_n$ SGD line SGDA$_n$ 225$A_n$, first-third $B_0$ SGD 226$B_0$-228$B_0$ can be accessed using an B$_0$ SGD line SGDB$_0$ 225$B_0$, and first-third $B_n$ SGD 226$B_n$-228$B_n$ can be accessed using an B$_n$ SGD line SGDB$_n$ 225$B_n$. First-third $A_0$ SGS 231$A_0$-233$A_0$ and first-third $A_n$ SGS 231$A_n$-233$A_n$ can be accessed using a gate select line SGS$_0$ 230A, and first-third $B_0$ SGS 231$B_0$-233$B_0$ and first-third $B_n$ SGS 231$B_n$-233$B_n$ can be accessed using a gate select line SGS$_1$ 230B.

In an example, the memory array 200 can include a number of levels of semiconductor material (e.g., polysilicon, etc.) configured to couple the control gates of each memory cell or select gate (or a portion of the control gates or select gates) of a respective tier of the array. Specific strings of memory cells in the array can be accessed, selected, or controlled using a combination of bit lines and select gates, etc., and specific memory cells at one or more tiers in the specific strings can be accessed, selected, or controlled using one or more access lines (e.g., word lines).

Figure 3:
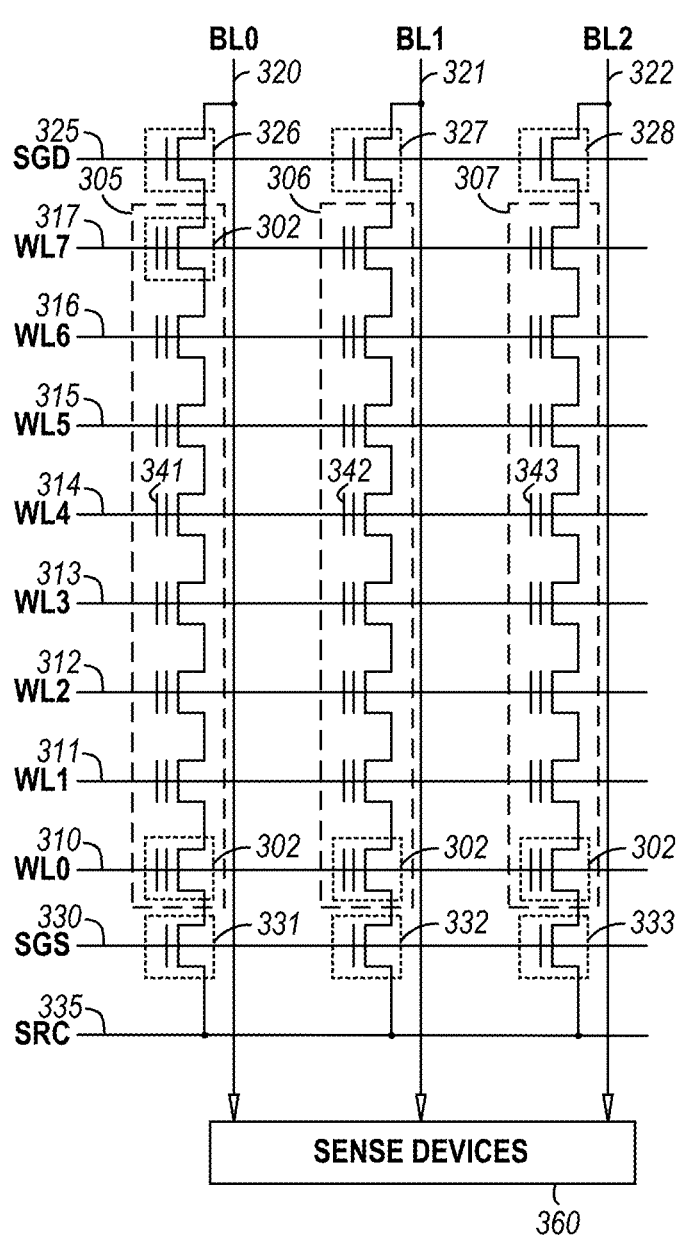

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines BL0-BL2 320-322) using a respective drain-side select gate (SGD) (e.g., first-third SGD 326-328). Although illustrated with 8 tiers (e.g., using word lines WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an Alternating Current (AC)-to-Direct Current (DC) converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
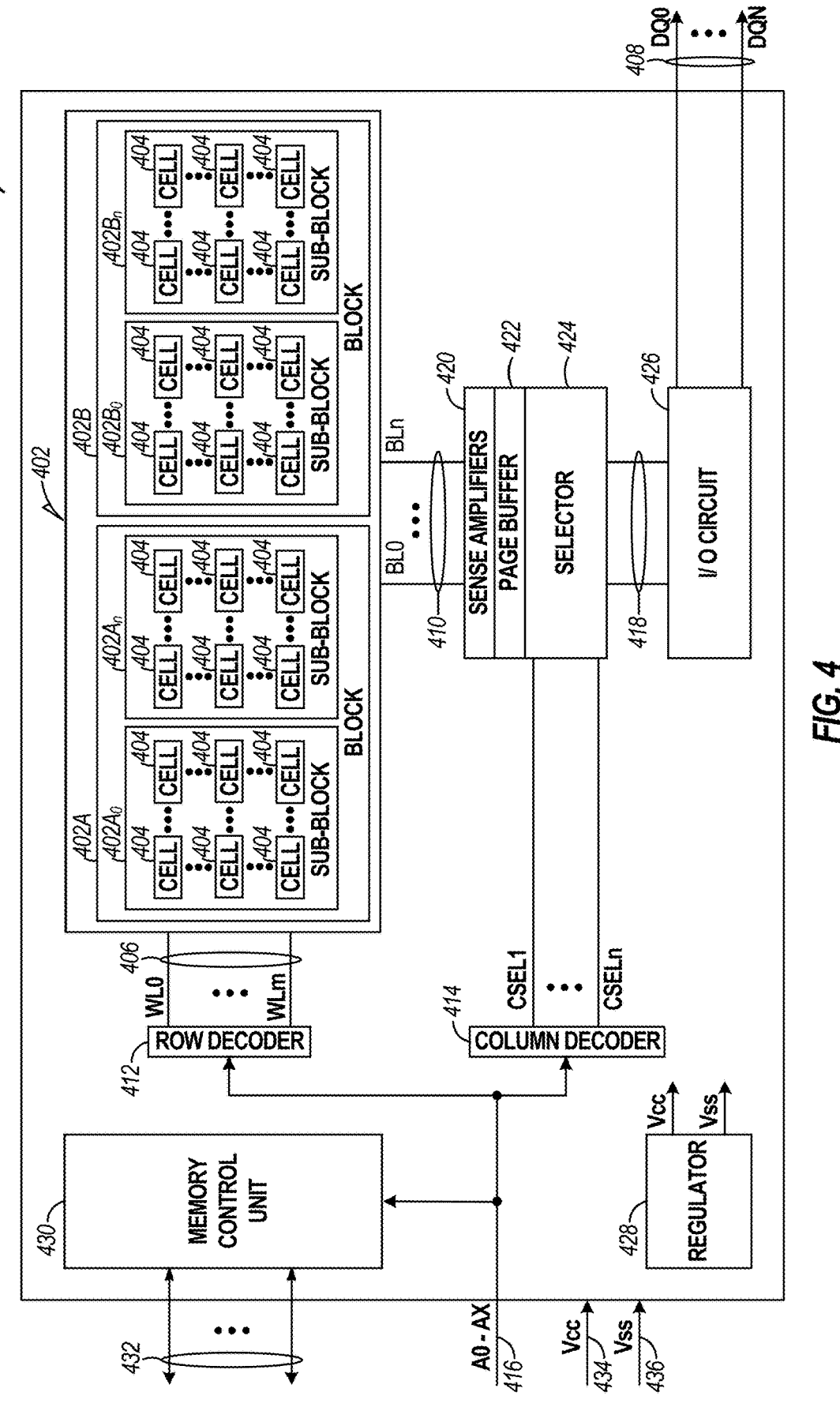
FIG. 4 illustrates an example block diagram of a memory module.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an I/O circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432 or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, determine which of the memory cells 404 are to be accessed, and provide signals to one or more of the access lines 406 (e.g., one or more of a plurality of word lines (WL0-WLm)) or the first data lines 410 (e.g., one or more of a plurality of bit lines (810-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
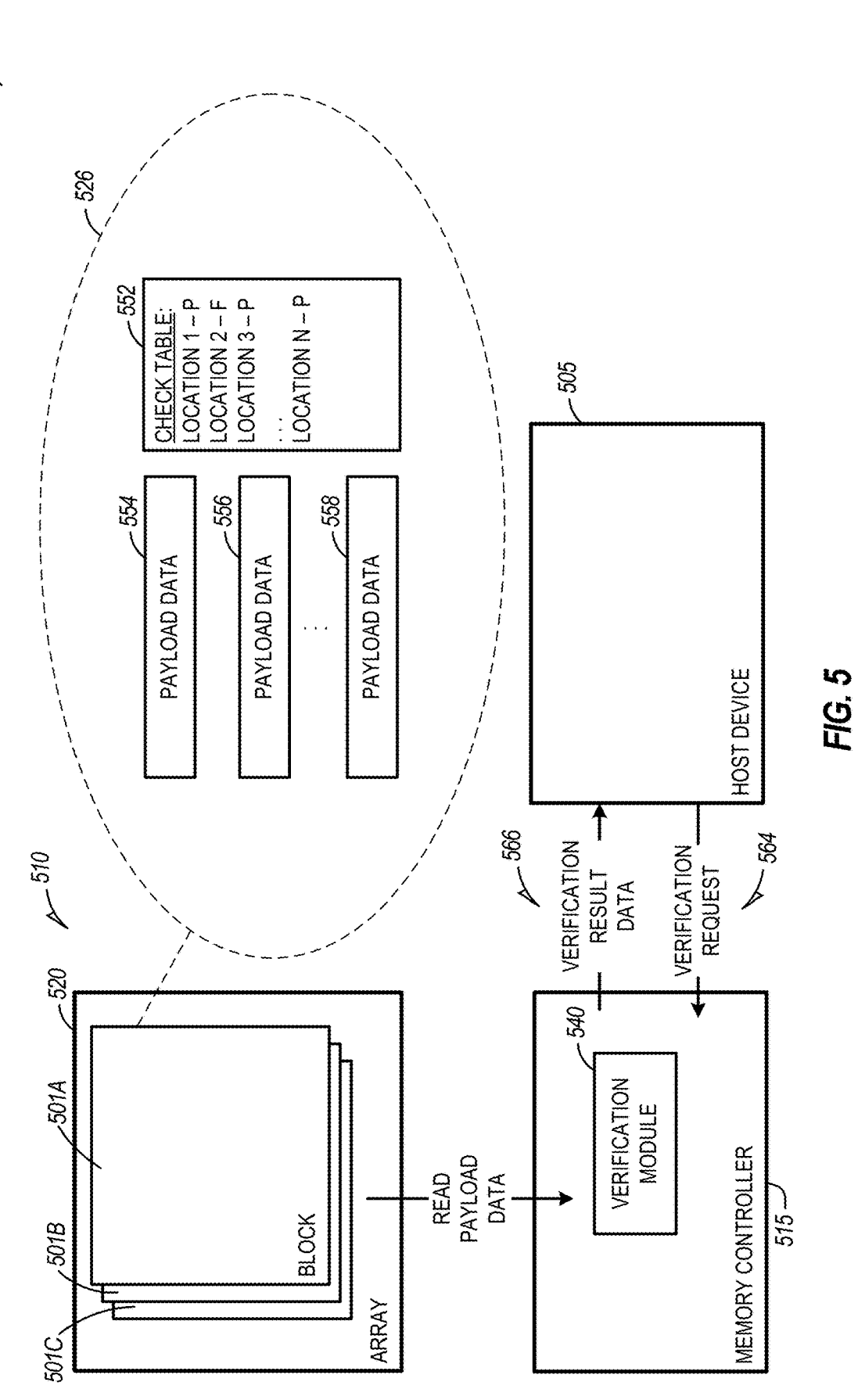
FIG. 5 illustrates an example environment demonstrating example techniques for performing data verification.

FIG. 5 illustrates an example environment 500 demonstrating example techniques for performing data verification.

The environment 500 comprises a memory device 510 and a host device 505. The memory device 510 comprises a memory array 520 and memory controller 515. The memory array 520 is a NAND memory array comprising a number of blocks 501A, 501B, 501C. Each block 501A, 501B, 501C includes a number of memory cells.

The memory controller 515 includes a verification module 540. The verification module 540 is configured to perform verification of data at the memory array 520. The verification module 540 may be similar to the verification module 140. For example, the verification module 540 may comprise a CRC engine or other suitable circuitry for performing verification of payload data. Also, in some examples, some or all of the verification module 540 may be implemented in software executed by a microcontroller, processor, or other suitable hardware at the memory controller 515.

The environment 500 illustrates an example data verification. The host device 505 sends a verification request 564 to the memory device 510 (e.g., the memory controller 515 thereof). The verification request 564 may indicate a portion of the memory array 520 comprising payload data 554 that is to be verified. In some examples, the verification request 564 may also comprise a known check value for the payload data 554.

The memory controller 515 (e.g., the verification module 540 thereof) may read the payload data 554 from the memory array and perform verification. This may include, for example, performing the mathematical operation on the payload data 554 to generate a calculated check value. In examples in which the verification request 564 includes a known check value, performing the verification may also include comparing the known check value to the calculated check value. If the known check value is the same as the calculated check value, then the payload data 554 may be verified. If the known check value is not the same as the calculated check value, then the payload data 554 may not be verified.

Upon performing verification, the memory controller 515 (e.g., verification module 540 thereof) may provide verification result data 566 to the host device 505. The verification result data 566 may indicate whether the payload data 554 passed or failed verification. In some examples, verification result data 566 may comprise an indication of the calculated check value. An indication of the calculated check value may be provided in addition to or instead of the indication of whether the payload data 554 passed or failed verification.

The environment 500 also includes an example arrangement 526 of the memory array 520. In the example arrangement 526, the memory array 520 comprises multiple instances of payload data including payload data 554, payload data 556, and payload data 558. The instances of payload data 554, 556, 558 may be stored at different portions of the memory array 520 such as, for example, at one or more of the blocks 501A, 501B, 501C.

A check table 552 may store verification result data for one or more instances of payload data 554, 556, 558 at the memory array 520. For example, the memory controller 515 (e.g., the verification module 540 thereof) may perform verification of various instances of payload data 554 and store results of the verification at the check table 552. In some examples, the host device 505 may request verification of multiple instances of payload data 554, 556, 558 with a single verification request 564. In response to the verification request 564, the memory controller 515 may determine verification result data 566 for the respective instances of payload data 554, 556, 558 and write the verification result data 566 to the check table 552. The host device 505 may access the verification result data 566 stored at the check table 552 by requesting to read all or a portion of the check table 552. The request to read the check table 552 may be formatted as a read request.

Figure 6:
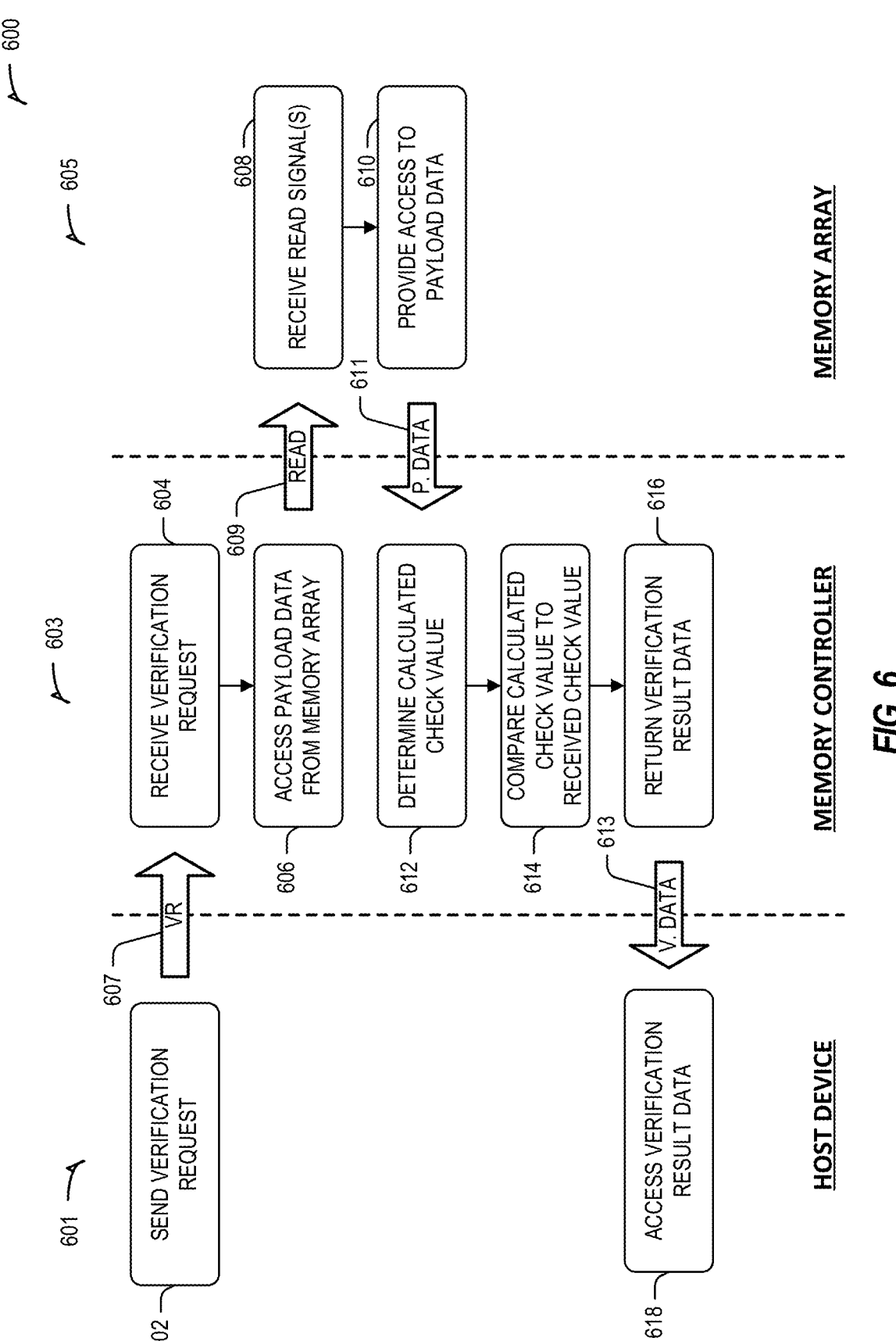
FIG. 6 is a flowchart showing one example of a process flow that can be executed to verify payload data.

FIG. 6 is a flowchart showing one example of a process flow 600 that can be executed in the environment 100 or the environment 500 to verify payload data. The process flow 600 comprises columns 601, 603, 605. Column 601 comprises operations that may be executed by a host device, such as the host device 105 or the host device 505. Column 603 comprises operations that may be performed by a memory controller, such as the memory controller 115 or the memory controller 515. Column 605 comprises operations that may be performed by a memory array, such as the memory array 120 or the memory array 520.

At operation 602, the host device sends a verification request 607 to the memory controller. At operation 604, the memory controller receives the verification request 607. The verification request 607 may comprise an indication of a portion of the memory array comprising the payload data that is to be verified. For example, the verification request 607 may indicate an address at the memory array, a range of addresses at the memory array, multiple ranges of addresses at the memory array, and/or the like. In the example of FIG. 6, the verification request 607 also comprises a calculated check value for the payload data. In some examples, the verification request 607 may indicate multiple instances of payload data to be verified.

At operation 606, the memory controller accesses payload data 611 indicated by the verification request 607. For example, the memory controller may provide one or more read signals 609 to the memory array. Read signals 609 may include signals provided to the memory array to facilitate the reading of the payload data 611 by the memory controller. For example, read signals 609 may include control signals provided to control lines of one or more components of the memory array, address signals provided to one or more components of the memory array, and/or the like. The memory array may receive the read signals at operation 608. In response to the read signals 609, the memory array may provide access to the payload data 611 at operation 610.

The memory controller may read the payload data 611 from the memory array and, at operation 612, generate a calculated check value. If the verification request 607 indicated more than one instance of payload data, the memory controller may read multiple instances of payload data 611 and generate multiple calculated check values for the respective instances of payload data.

At operation 614, the memory controller may compare the calculated check value or values to the known check value or values received with the verification request 607. As described herein, if a calculated check value for payload data 611 matches the known check value for the payload data 611, then the payload data 611 may pass verification. If the calculated check value for payload data 611 does not match the known check value for the payload data 611, then the payload data may fail verification. A calculated check value may match a known check value, for example, if the calculated check value is equal to the known check value.

At operation 616, the memory controller may return the verification result data 613 to the host device, which may access the verification result data at operation 618. As described herein, the memory controller may provide the verification result data 613 to the host device in any suitable manner. In some examples, the memory controller provides a message including the verification result data via a communication interface between the memory controller and the host device. In other examples, a message provided by the memory controller to the host device may comprise an indication that the verification is complete. The host device may respond to the message by requesting to access a location at the memory device where the verification result data is stored. In some examples, the message comprising an indication that the verification is complete will also include an indication of an address or addresses at the memory device where the verification result data 613 is stored. In some examples, the verification result data may be stored at a location in the memory array that is known to the host device.

Figure 7:
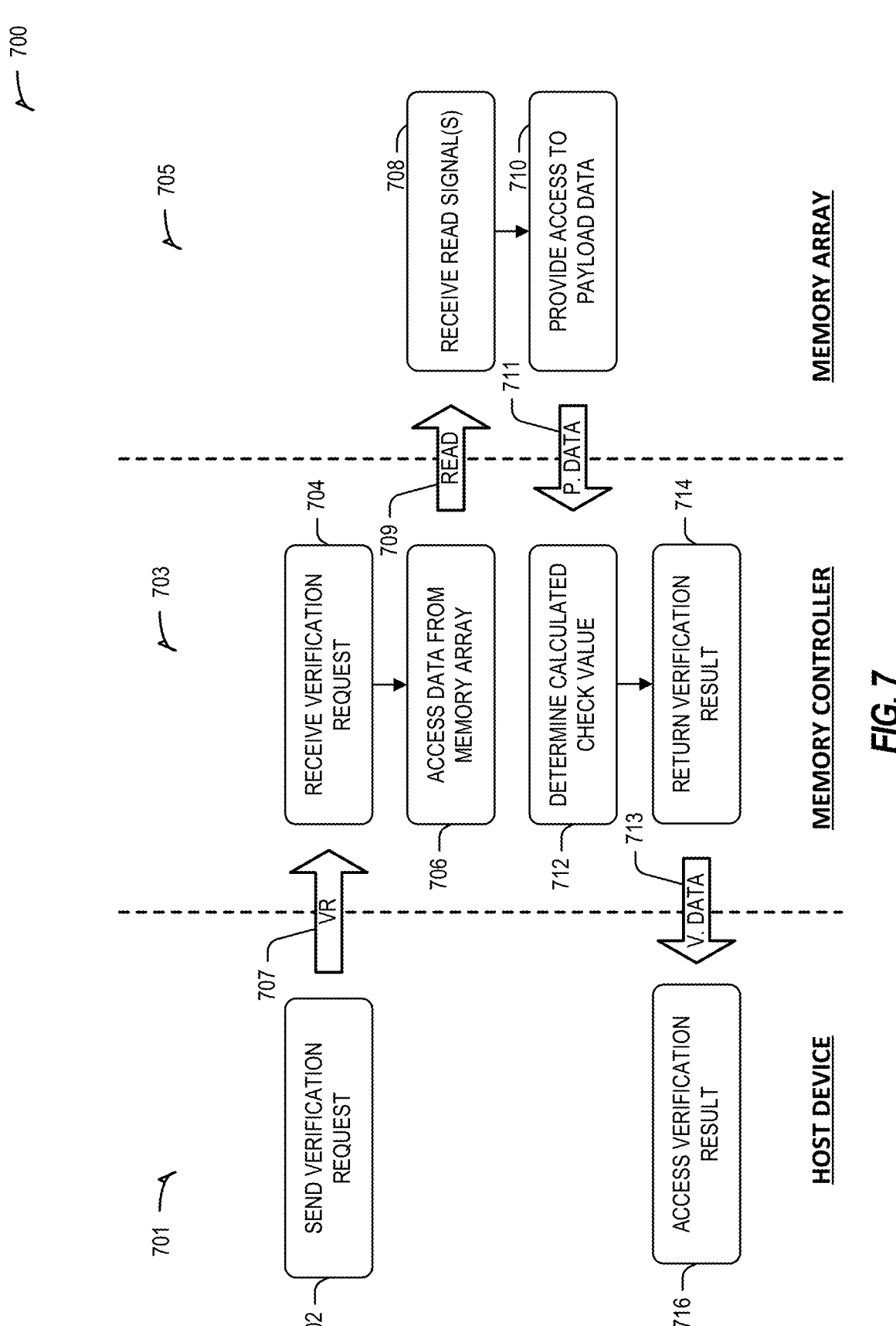
FIG. 7 is a flowchart showing another example of a process flow that can be executed to verify payload data.

FIG. 7 is a flowchart showing another example of a process flow 700 that can be executed in the environment 100 or the environment 500 to verify payload data. In the example of FIG. 7, the host device does not provide a known check value for the payload data. The memory controller, accordingly, returns a calculated check value to the host device. The host device, then, may compare the calculated computed check value to a known check value and evaluate whether the payload data passes or fails the verification.

The process flow 700 comprises columns 701, 703, 705. Column 701 comprises operations that may be executed by a host device, such as the host device 105 or the host device 505. Column 703 comprises operations that may be performed by a memory controller, such as the memory controller 115 or the memory controller 515. Column 705 comprises operations that may be performed by a memory array, such as the memory array 120 or the memory array 520.

At operation 702, the host device sends a verification request 707 to the memory controller. At operation 704, the memory controller receives the verification request 707. The verification request 707 may comprise an indication of a portion of the memory array comprising the payload data that is to be verified. For example, the verification request 707 may indicate an address at the memory array, a range of addresses at the memory array, multiple ranges of addresses at the memory array, and/or the like. In the example of FIG. 7, the verification request 707 may omit a known check value or values associated with the indicated payload data. In some examples, the verification request 707 may indicate multiple instances of payload data to be verified.

At operation 706, the memory controller accesses payload data 711 indicated by the verification request 707. For example, the memory controller may provide one or more read signals 709 to the memory array. Read signals 709 may include signals provided to the memory array to facilitate the reading of the payload data 711 by the memory controller. For example, read signals 709 may include control signals provided to control lines of one or more components of the memory array, address signals provided to one or more components of the memory array, and/or the like. The memory array may receive the read signals at operation 708. In response to the read signals 709, the memory array may provide access to the payload data 711 at operation 710.

The memory controller may read the payload data 711 from the memory array and, at operation 712, generate a calculated check value. If the verification request 707 indicated more than one instance of payload data, the memory controller may read multiple instances of payload data 711 and generate multiple calculated check values for the respective instances of payload data.

At operation 714, the memory controller may return verification result data 713 to the host device, which may access the verification result data at operation 716. In this example, the returned verification result data 713 may include an indication of the calculated check value for the payload data. The host device may compare the calculated check value to a known check value for the payload data and determine whether the payload data passes or fails verification. As described herein, the memory controller may provide the verification result data 713 to the host device in any suitable manner. In some examples, the memory controller provides a message including the verification result data via a communication interface between the memory controller and the host device. In other examples, a message provided by the memory controller to the host device may comprise an indication that the verification is complete. The host device may respond to the message by requesting to access a location at the memory device where the verification result data is stored. In some examples, the message comprising an indication that the verification is complete will also include an indication of an address or addresses at the memory device where the verification result data 713 is stored. In some examples, the verification result data may be stored at a location in the memory array that is known to the host device.

Figure 8:
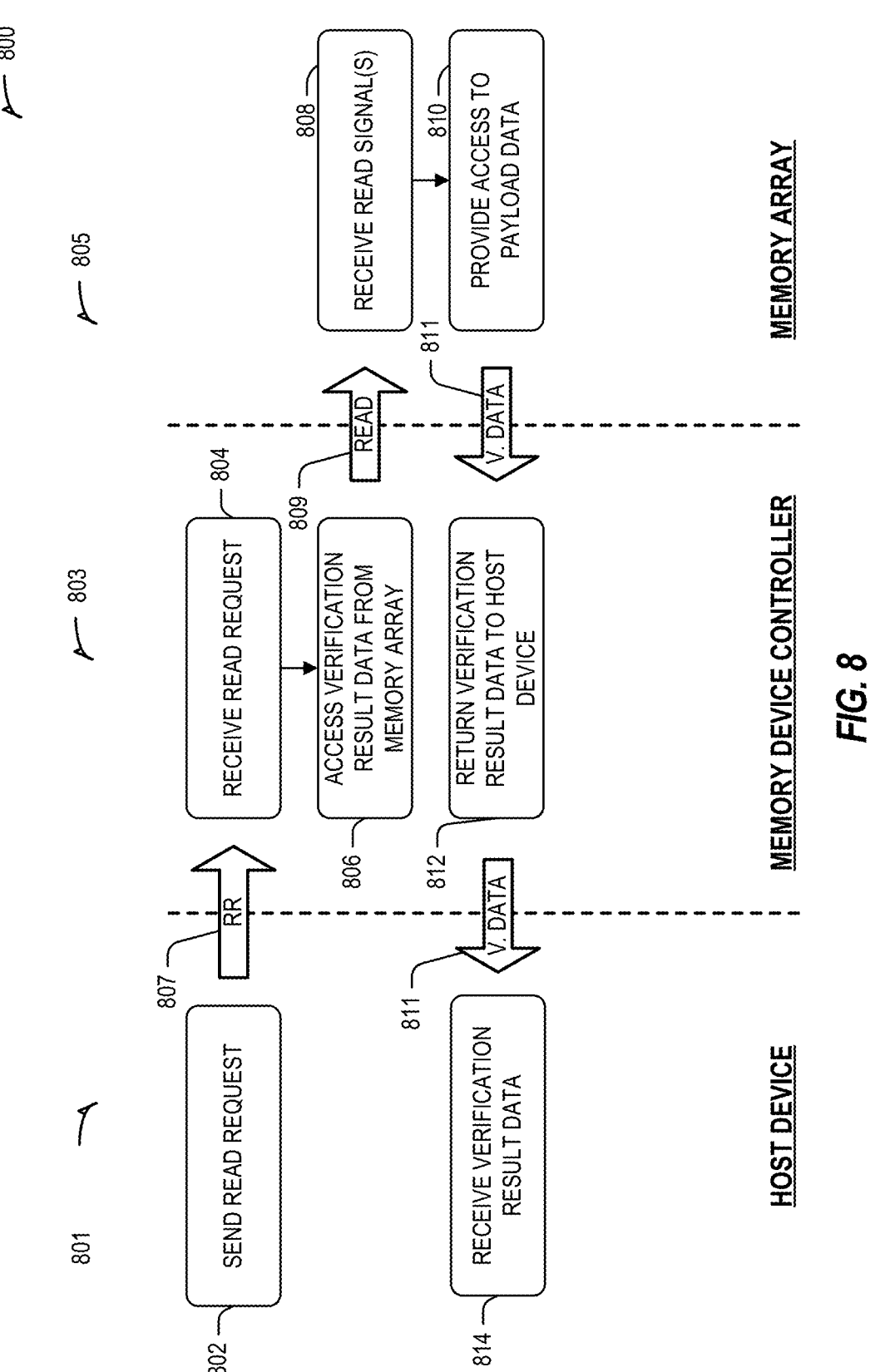
FIG. 8 is a flowchart showing one example of a process flow that can be executed to provide payload verification data to the host device.

FIG. 8 is a flowchart showing one example of a process flow 800 that can be executed in the environment 100 or the environment 500 to provide payload verification data to a host device. For example, the process flow 800 shows one way that the host data may access verification result data that is stored at the memory array.

The process flow 800 comprises columns 801, 803, 805. Column 801 comprises operations that may be executed by a host device, such as the host device 105 or the host device 505. Column 803 comprises operations that may be performed by a memory controller, such as the memory controller 115 or the memory controller 515. Column 805 comprises operations that may be performed by a memory array, such as the memory array 120 or the memory array 520.

At operation 802, the host device may send a read request 807 to the memory device controller. The memory device controller may receive the read request at operation 804. In some examples, the read request 807 may indicate a location at the memory array that stores verification result data previously generated by the memory device controller. For example, the read request 807 may indicate all or part of a check table, such as the check table 552.

At operation 806, the memory controller accesses verification result data 811 indicated by the read request 807. For example, the memory controller may provide one or more read signals 809 to the memory array. Read signals 809 may include signals provided to the memory array to facilitate the reading of the verification result data 811 by the memory controller. For example, read signals 809 may include control signals provided to control lines of one or more components of the memory array, address signals provided to one or more components of the memory array, and/or the like. The memory array may receive the read signals at operation 808. In response to the read signals 809, the memory array may provide access to the verification result data 811 at operation 810.

The memory device controller may read the verification result data 811 and return the verification result data, at operation 812, to the host device via a communication interface between the host device and the memory device. The host device may receive the verification result data at operation 814.

In some examples, a memory device may be pre-loaded with payload data prior to installation at or with a host device. A programming appliance may pre-program the memory device by providing payload data during a manufacturing and/or assembly process. As described herein, it may be desirable for the programming appliance to verify the pre-loaded data before the pre-loaded memory device is installed at or with the host device. The data verification examples described herein may also be implemented in the context of a memory device and a programming appliance.

Figure 9:
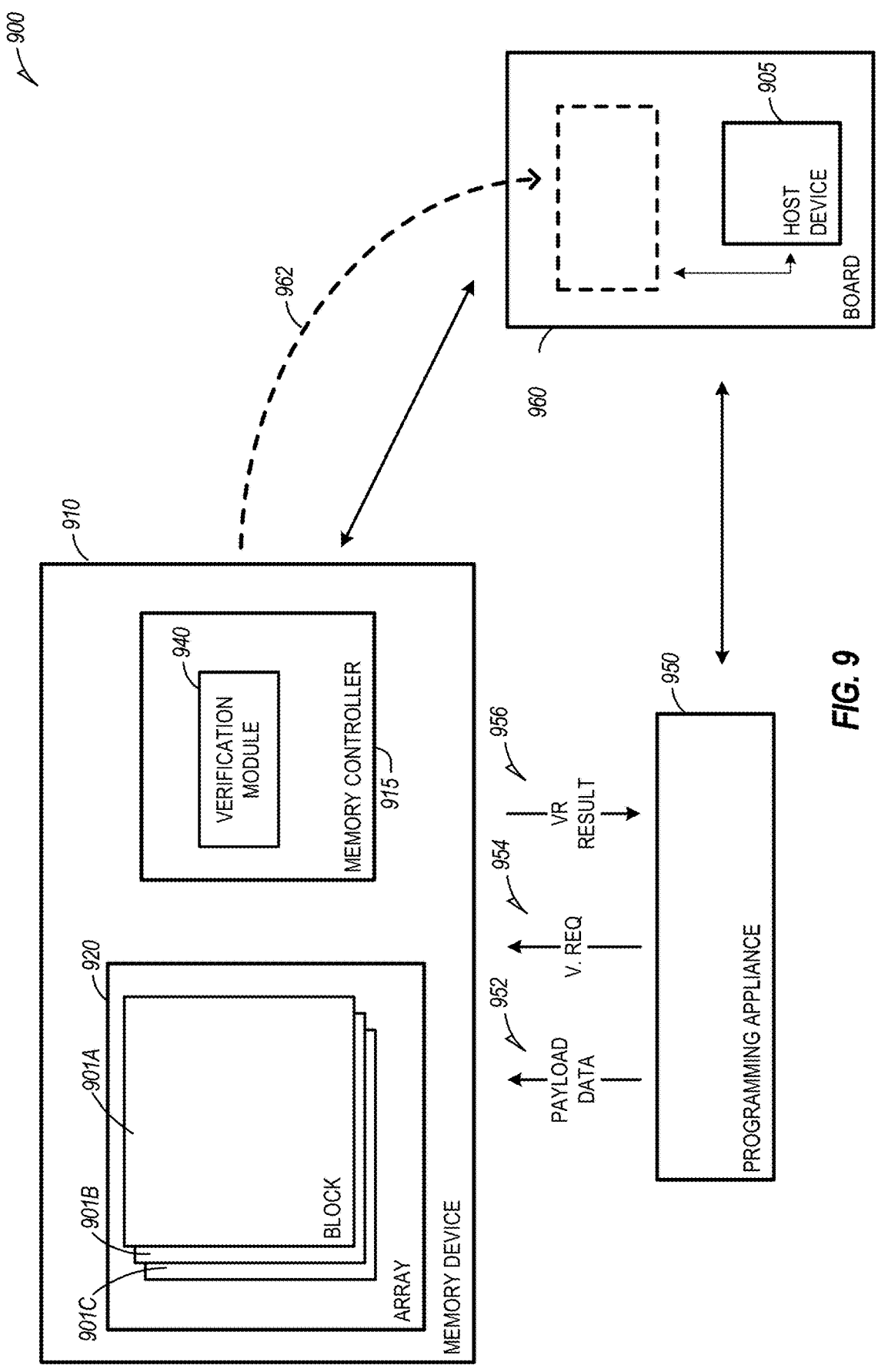
FIG. 9 illustrates an example environment demonstrating example techniques for performing data verification during a manufacturing and/or assembly process.

FIG. 9 illustrates an example environment 900 demonstrating example techniques for performing data verification during a manufacturing and/or assembly process. The environment 900 comprises a memory device 910 and a host device 905. The memory device 910 comprises a memory array 920 and memory controller 915. The memory array 920 is a NAND memory array comprising a number of blocks 901A, 901B, 901C. Each block 901A, 901B 901C includes a number of memory cells.

The memory controller 915 includes a verification module 940. The verification module 940 is configured to perform verification of data at the memory array 920. The verification module 940 may be similar to the verification modules 140, 540. For example, the verification module 940 may comprise a CRC engine or other suitable circuitry for performing verification of payload data. Also, in some examples, some or all of the verification module 940 may be implemented in software executed by a microcontroller, processor, or other suitable hardware at the memory controller 915.

The environment 900 also includes a programming appliance 950. The programming appliance 950 may be any suitable programming appliance including, for example, a programming appliance available from Data 10 or Minato Advanced Technologies, Inc. The programming appliance 950 may be configured to provide payload data 952 to the memory device 910. For example, the payload data 952 may be written to one or more blocks 901A, 901B, 901C at the memory array 920.

Upon writing the payload data 952 to the memory device 910, the programming appliance 950 may be configured to provide a verification request 954 to the memory controller 915. The verification request 954 may indicate the payload data 952, for example, by an indication of a portion of the memory array 920 storing the payload data 952. Optionally, the verification request 954 may also comprise a known check value for the payload data 952.

In response to the verification request 954, the memory controller 915 (the verification module 940 thereof) may read the payload data 952 from the memory array 920 and apply the mathematical operation to generate a calculated check value for the payload data 952. Optionally, the memory controller 915 may compare the calculated check value to the known check value provided by the programming appliance 950.

The memory controller 915 may provide the programming appliance 950 with verification result data 956. Verification result data 956 may indicate whether the payload data 952 has passed or failed verification. In some examples, the verification result data 956 may comprise the calculated check value for the payload data 952. The programming appliance 950 may compare the calculated check value from the verification result data 956 to the known check value for the payload data 952. This comparing at the programming appliance 950 may be in addition to or instead of the comparing performed by the memory controller 915. As described herein, the verification result data may be provided directly to the programming appliance 950. In some examples, the verification result data 956 may be written to a location at the memory array 920 where it is accessible to the programming appliance 950. For example, the programming appliance 950 may send a read request requesting to read the portion of the memory array 920 including the verification result data 956.

After the pre-loaded payload data 952 is verified, the memory device 910 may be installed to the host device 905 as indicated by arrow 962. In the example of FIG. 9, the host device 905 and the memory device 910 are installed on a common board 960. It will be appreciated, however, that various other arrangements of the combination of the host device 905 and the memory device 910 may be used.

In some examples, the host device 905 may be in communication with programming appliance 950 and/or with the memory device 910 during programming of the memory device 910. For example, the host device may direct production states of the memory device 910, for example, as described herein with respect to FIGS. 11 and 12.

Figure 10:
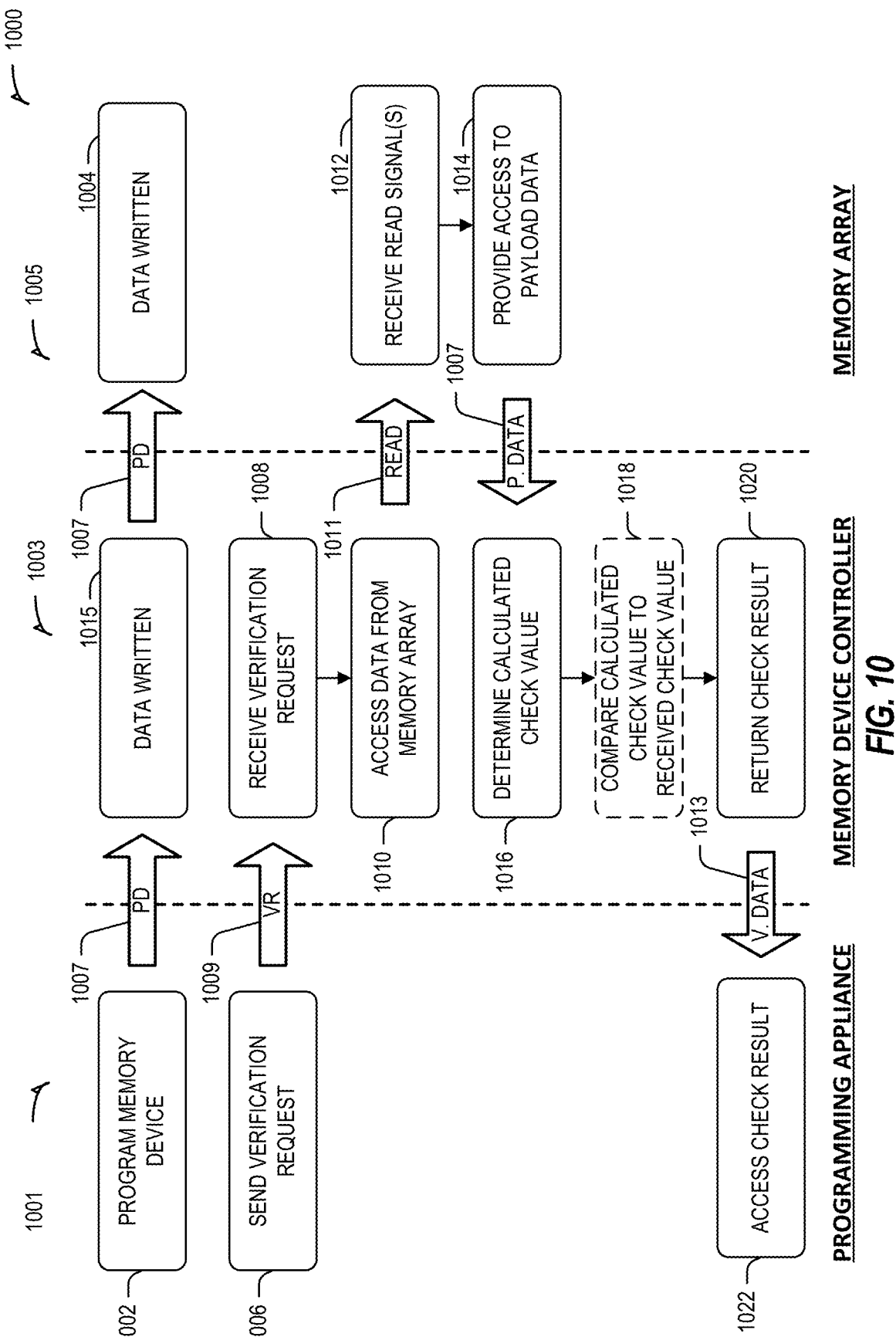
FIG. 10 is a flowchart showing one example of a process flow that can be executed to verify payload data.

FIG. 10 is a flowchart showing one example of a process flow 1000 that can be executed in the environment 900 to verify payload data. The process flow 1000 comprises columns 1001, 1003, 1005. Column 1001 comprises operations that may be executed by a programming appliance, such as the programming appliance 950. Column 1003 comprises operations that may be performed by a memory controller, such as the memory controller 915. Column 1005 comprises operations that may be performed by a memory array, such as the memory array 920.

At operation 1002, the programming device may program the memory device by providing payload data 1007 to the memory device, where the payload data 1007 may be written to the memory array at operations 1015 and 1004. For example, the memory controller 915 may manage the writing of the payload data 1007 to the memory array 920.

At operation 1006, the programming appliance may send a verification request 1009 to the memory device controller, which may receive the verification request at operation 1008. The verification request 1009 may comprise an indication of a portion of the memory array comprising the payload data that is to be verified. For example, the verification request 1009 may indicate an address at the memory array, a range of addresses at the memory array, multiple ranges of addresses at the memory array, and/or the like. The verification request 1009 may comprise a calculated check value for the payload data. In some examples, the verification request 1009 may indicate multiple instances of payload data to be verified.

At operation 1010, the memory controller accesses the payload data 1007, as indicated by the verification request 1009. For example, the memory controller may provide one or more read signals 1011 to the memory array. Read signals 1011 may include signals provided to the memory array to facilitate the reading of the payload data 1007 by the memory controller. For example, read signals 1011 may include control signals provided to control lines of one or more components of the memory array, address signals provided to one or more components of the memory array, and/or the like. The memory array may receive the read signals at operation 1012. In response to the read signals 1011, the memory array may provide access to the payload data 1007 at operation 1014.

The memory controller may read the payload data 1007 from the memory array and, at operation 1016, generate a calculated check value. If the verification request 1009 indicated more than one instance of payload data 1007, the memory controller may read multiple instances of payload data 1007 and generate multiple calculated check values for the respective instances of payload data.

At optional operation 1018, the memory controller may compare the calculated check value or values to the known check value or values received with the verification request 1009. As described herein, if a calculated check value for payload data 1007 matches the known check value for the payload data 1007, then the payload data 1007 may pass verification. If the calculated check value for payload data 1007 does not match the known check value for the payload data 1007, then the payload data may fail verification.

At operation 1020, the memory controller may return the verification result data 1013 to the programming appliance, which may access the verification result data 1013 at operation 1022. As described herein, the memory controller may provide the verification result data 1013 to the programming appliance in any suitable manner. In some examples, the memory controller provides a message including the verification result data directly to the programming appliance. In other examples, a message provided by the memory controller to the programming appliance may comprise an indication that the verification is complete. The programming appliance may respond to the message by requesting to access a location at the memory device where the verification result data is stored. In some examples, the message comprising an indication that the verification is complete will also include an indication of an address or addresses at the memory device where the verification result data 1013 is stored. In some examples, the verification result data may be stored at a location in the memory array that is known to the programming appliance.

In some examples, when the memory device 910 is installed with the host device 905 (e.g., either directly and/or via a common component, such as the board 960), electrical contacts of the memory device 910 may be electrically coupled to the host device 905 and/or board 960 using a soldering technique that involves high temperatures. When the memory device 910 is subject to high temperatures, the high temperatures may tend to degrade the integrity of data stored at the memory array 920. In some examples, such as according to the JEDEC eMMC 5.0 Standard, the memory device 910 may be operated in different production states. For example, when the memory device 910 is operated in a production state corresponding to pre-soldering writes, it may store re-loaded payload data in a manner that makes the data more robust to the high temperatures that will be encountered during a subsequent soldering process.

Figure 11:
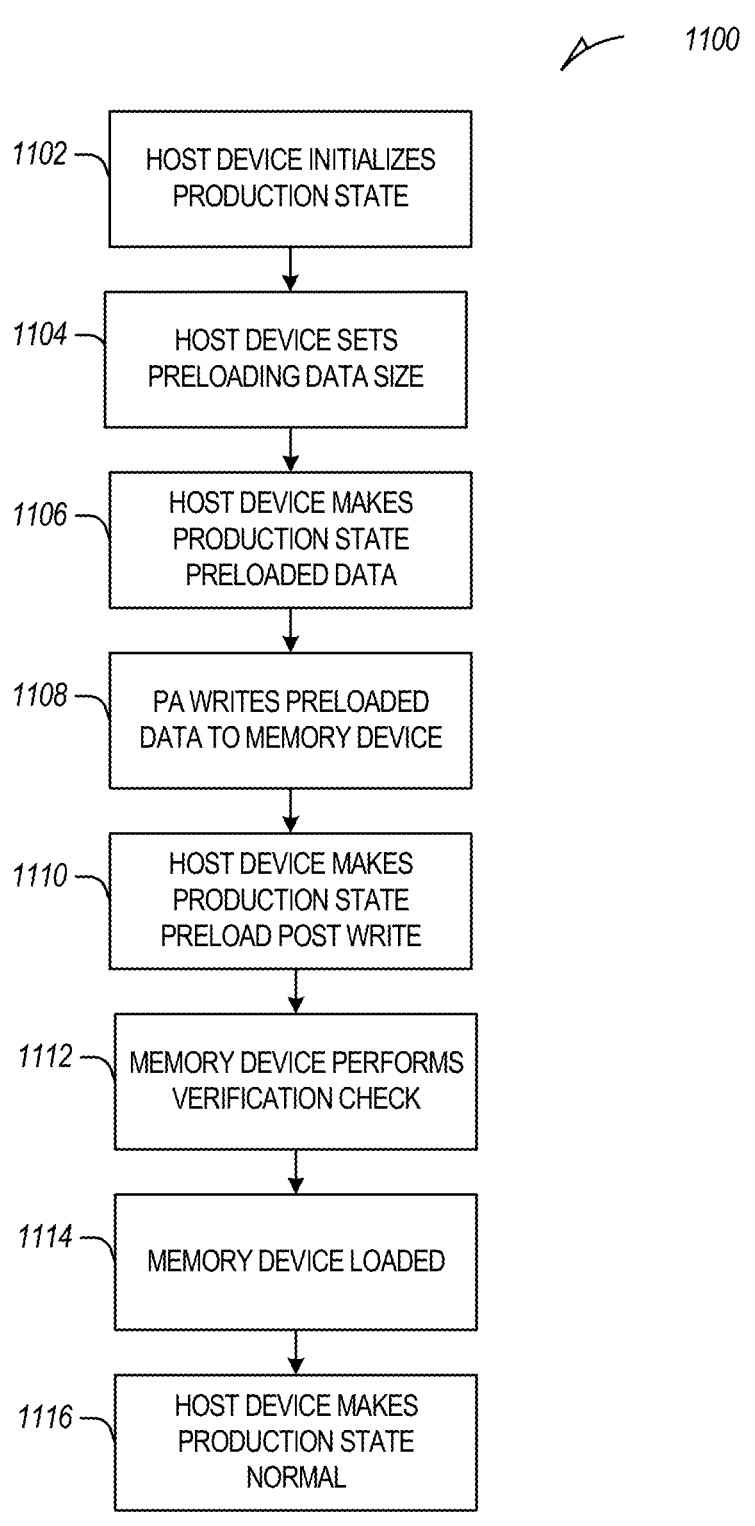
FIG. 11 is a flowchart showing one example of a process flow that may be executed to program a memory device utilizing data integrity techniques as described herein.

FIG. 11 is a flowchart showing one example of a process flow 1100 that may be executed in the environment 900 to program the memory device 910 utilizing data integrity techniques as described herein. In this example, the host device 905 may be in communication with the programming appliance 950 and/or the memory device 910 to configure the states of the memory device.

At operation 1102, production state awareness may be initialized at the memory device 910. The production state awareness of the memory device 910 may be initialized by the programming appliance 950 and/or by the host device 905. Initializing the production state awareness of the memory device 910 may include, for example, setting one or more configuration bits at the memory device 910.

At operation 1104, the host device 905 may set a pre-loading data size at the memory device 910. The preloading data size may be a size of payload data that is to be pre-loaded to the memory device 910 before the memory device 910 is installed to the host device 905. At operation 1106, the host device 905 may set the production state of the memory device 910 to a state associated with the preloading of data to the memory device 910.

At operation 1108, the programming appliance 950 writes the pre-loaded payload data to the memory device 910. The programming appliance 950 may also perform various other configuration of the memory device 910. At operation 1110, the host device sets the production state awareness of the memory device 910 to a pre-load post-write state. This, for example, may configure the memory device 910 to prepare for heat associated with soldering the memory device 910 to the host device 905 (e.g., to the board 960 including the host device 905).

At operation 1112, memory device 910 may verify the payload data that has been preloaded. In various examples, the operation 1112 may be performed as described herein with respect to FIGS. 9 and 10. At operation 1114, the memory device 910 is loaded to the host device 905. For example, the memory device 910 may be soldered to the board 960 including the host device 905. Any suitable soldering or other technique may be used such as, for example, PCB ball soldering. At operation 1116, the host device 905 may modify the production state of the memory device 910 to a normal production state. In this state, the memory device 910 and host device 905 may perform standard operations.

Figure 12:
FIG. 12 is a flowchart showing another example of a process flow that may be executed to program a memory device utilizing data integrity techniques as described herein.
Figure 12:
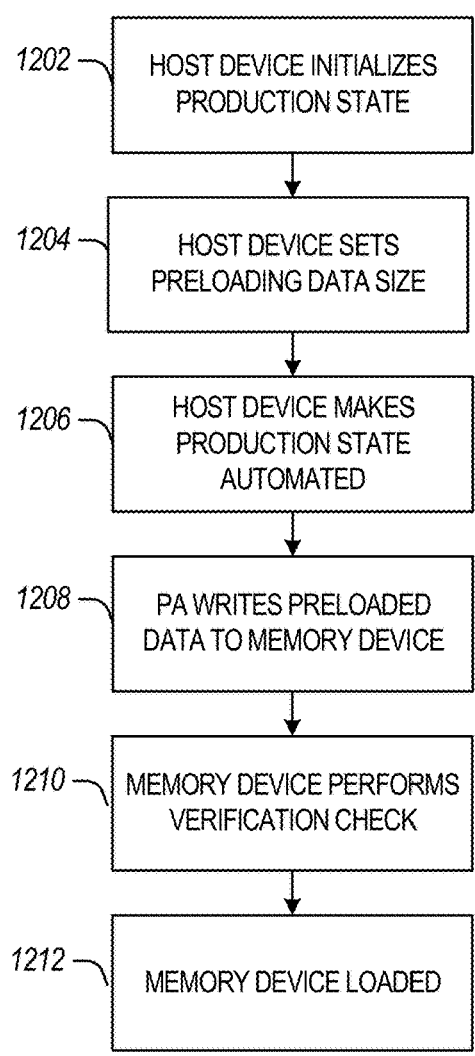

FIG. 12 is a flowchart showing another example of a process flow 1200 that may be executed in the environment 900 to program the memory device 910 utilizing data integrity techniques as described herein. In the example of FIG. 12, the production state of the memory device 910 is configured to an automated mode.

At operation 1202, production state awareness may be initialized at the memory device 910. The production state awareness of the memory device 910 may be initialized by the programming appliance 950 and/or by the host device 905. Initializing the production state awareness of the memory device 910 may include, for example, setting one or more configuration bits at the memory device 910. At operation 1204, the host device 905 may set a pre-loading data size at the memory device 910. The preloading data size may be a size of payload data that is to be pre-loaded to the memory device 910 before the memory device 910 is installed to the host device 905.

At operation 1206, the host device 905 may set the production state of the memory device 910 to an automated state. In the automated state, the memory device 910 may be configured to automatically detect its production state and configure itself accordingly.

At operation 1208, the programming appliance 950 writes the pre-loaded payload data to the memory device 910. Memory device 910 may determine that it should be set to the pre-soldering write state and may configure itself accordingly.

At operation 1210, memory device 910 may verify the payload data that has been preloaded. In various examples, the operation 1212 may be performed as described herein with respect to FIGS. 9 and 10. At operation 1212, the memory device 910 is loaded to the host device 905. For example, the memory device 910 may be soldered to the board 960 including the host device 905. Any suitable soldering or other technique may be used such as, for example, PCB ball soldering. After loading, the memory device 910 may modify its production state to normal.

Figure 13:
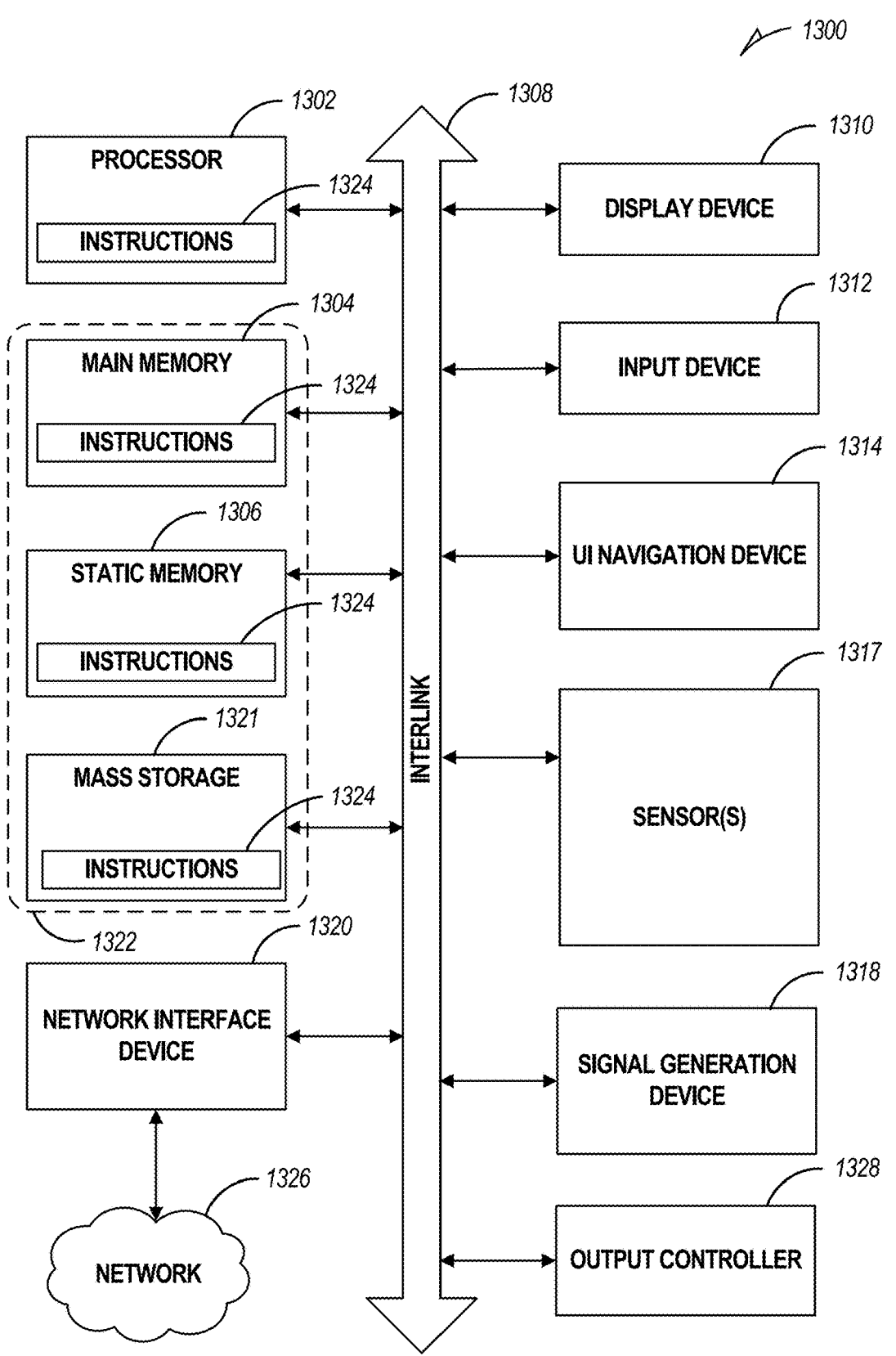
FIG. 13 is a block diagram illustrating an example of a machine upon which one or more embodiments may be implemented.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine

1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1300 (e.g., the host device 105, 505, 905, the memory device 110, 510, 910, etc.) may include a hardware processor 1302 (e.g., a CPU, a GPU, a hardware processor core, or any combination thereof, such as the memory controller 115, 515, 915, etc.), a main memory 1304, and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312, and UI navigation device 1314 may be a touch screen display. The machine 1300 may additionally include a storage device, a signal generation device 1318 (e.g., a speaker), a network interface device 1320, and one or more sensors 1317, such as a global positioning system (GPS) sensor, compass, accelerometer, or other sensor. The machine 1300 may include an output controller 1328, such as a serial (e.g., USB, parallel, or other wired or wireless (e.g., infrared (IR), near field communication (NFC), etc.) connection to communicate or control one or more peripheral devices (e.g., a printer, card reader, etc.).

The storage device 1316 may include a non-transitory machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute the machine readable medium 1322.

While the machine readable medium 1322 is illustrated as a single medium, the term "machine readable medium" may include a single medium or multiple media (e.g., a centralized or distributed database, or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., EPROM, EEPROM) and flash memory devices; magnetic disks, such as internal hard disks and removable disks; magneto-optical disks; and CD-ROM and DVD-ROM disks.

The instructions 1324 (e.g., software, programs, an operating system (OS), etc.) or other data are stored on a storage device 1321, can be accessed by the memory 1304 for use by the processor 1302. The memory 1304 (e.g., DRAM) is typically fast, but volatile, and thus a different type of storage than the storage device 1321 (e.g., an SSD), which is suitable for long-term storage, including while in an "off" condition. The instructions 1324 or data in use by a user or the machine 1300 are typically loaded in the memory 1304 for use by the processor 1302. When the memory 1304 is full, virtual space from the storage device 1321 can be allocated to supplement the memory 1304; however, because the storage device 1321 device is typically slower than the memory 1304, and write speeds are typically at least twice as slow as read speeds, use of virtual memory can greatly reduce user experience due to storage device latency (in contrast to the memory 1304, e.g., DRAM). Further, use of the storage device 1321 for virtual memory can greatly reduce the usable lifespan of the storage device 1321.

In contrast to virtual memory, virtual memory compression (e.g., the Linux® kernel feature "ZRAM") uses part of the memory as compressed block storage to avoid paging to the storage device 1321. Paging takes place in the compressed block until it is necessary to write such data to the storage device 1321. Virtual memory compression increases the usable size of memory 1304, while reducing wear on the storage device 1321.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival SATA based SSD devices. However, demand for mobile device performance continues to increase, such as to fully enable virtual or augmented-reality devices, utilize increasing networks speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

The above detailed description includes references to the accompanying drawings, which form a part of the detailed description. The drawings show, by way of illustration, specific embodiments in which the disclosure can be practiced. These embodiments are also referred to herein as "examples," Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate, and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the control gate may form recesses, while the SGD may remain less recessed or even not recessed. These doping configurations may thus enable selective etching into the distinct tiers (e.g., SGS, control gate, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to," or "coupled with" another element, it can be directly on, connected, or coupled with the other element or intervening elements may be present. In contrast, when an element is referred to as being "directly on," "directly connected to," or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times.

Examples of these tangible computer-readable media can include, but are not limited to, hard disks, removable magnetic disks, removable optical disks (e.g., compact discs and digital video disks), magnetic cassettes, memory cards or sticks, RAMs, ROMs, SSDs, UFS device, eMMC device, and the like.

EXAMPLES

Example 1 is a system, comprising: a managed NAND non-volatile memory device comprising: a memory array; and a memory controller, the memory controller being programmed to perform operations comprising: receiving a verification request from a requesting device, the verification request comprising an indication of a first portion of the memory array, and a first known check value; applying an operation based at least in part on first data from the first portion of the memory array to generate a calculated check value; determining verification result data, the determining of the verification result data being based at least in part on the first known check value and the calculated check value; and returning the verification result data to the requesting device.

In Example 2, the subject matter of Example 1 optionally includes the returning of the verification result data to the requesting device comprising sending the verification result data to the requesting device, the sending being responsive to the verification request.

In Example 3, the subject matter of any one or more of Examples 1-2 optionally include the indication of the first portion of the memory array comprising a start address indicating a first location at the memory array and a stop address indicating a second location at the memory array.

In Example 4, the subject matter of any one or more of Examples 1-3 optionally include the operations further comprising: writing the verification result data to a location at a memory array of the managed NAND non-volatile memory device that is accessible to the requesting device; receiving, from the requesting device, a request to read the location at the memory array; and responsive to the request to read the location at the memory array, sending the verification result data to the requesting device.

In Example 5, the subject matter of any one or more of Examples 1-4 optionally include the requesting device being a programming appliance, the operations further comprising: receiving, by the managed NAND non-volatile memory device, the first data from the programming appliance; and writing the first data to the first portion of the memory array.

In Example 6, the subject matter of any one or more of Examples 1-5 optionally include the verification request comprising indications of a plurality of portions of the memory array and a plurality of known check values, the indications of the plurality of portions of the memory array comprising the indication of the first portion of the memory array and an indication of a second portion of the memory array, the plurality of known check values comprising the first known check value corresponding to the first portion of the memory array and a second known check value corresponding to the second portion of the memory array.

In Example 7, the subject matter of Example 6 optionally includes verification result data comprising first verification result data describing the first data from the first portion of the memory array and a second verification result data describing second data from the second portion of the memory array.

In Example 8, the subject matter of Example 7 optionally includes the operations further comprising: writing, by the memory controller, the verification result data to a table at the memory array, the table comprising a first record including the first verification result data and a second record including the second verification result data; receiving, from the requesting device, a request to read the table; and responsive to the request to read the table, sending at least a portion of the verification result data from the table to the requesting device.

Example 9 is a method comprising: receiving, by a memory controller of a managed NAND non-volatile memory device and from a requesting device, a verification request, the verification request comprising an indication of a first portion of a memory array of the managed NAND non-volatile memory device, and a first known check value; applying, by the memory controller, an operation based at least in part on first data from the first portion of the memory array to generate a calculated check value; determining, by the memory controller, verification result data, the determining of the verification result data being based at least in part on the first known check value and the calculated check value; and returning, by the memory controller, the verification result data to a requesting device.

In Example 10, the subject matter of Example 9 optionally includes the returning of the verification result data to the requesting device comprising sending the verification result data to the requesting device, the sending being responsive to the verification request.

In Example 11, the subject matter of any one or more of Examples 9-10 optionally include the indication of the first portion of the memory array comprising a start address indicating a first location at the memory array and a stop address indicating a second location at the memory array.

In Example 12, the subject matter of any one or more of Examples 9-11 optionally include the operations further comprising: writing the verification result data to a location at a memory array of the managed NAND non-volatile memory device that is accessible to the requesting device; receiving, from the requesting device, a request to read the location at the memory array; and responsive to the request to read the location at the memory array, sending the verification result data to the requesting device.

In Example 13, the subject matter of any one or more of Examples 9-12 optionally include the requesting device being a programming appliance, further comprising: receiving, by the managed NAND non-volatile memory device, the first data from the programming appliance; and writing the first data to the first portion of the memory array.

In Example 14, the subject matter of any one or more of Examples 9-13 optionally include the verification request comprising indications of a plurality of portions of the memory array and a plurality of known check values, the indications of the plurality of portions of the memory array comprising the indication of the first portion of the memory array and an indication of a second portion of the memory array, the plurality of known check values comprising the first known check value corresponding to the first portion of the memory array and a second known check value corresponding to the second portion of the memory array.

In Example 15, the subject matter of Example 14 optionally includes verification result data comprising first verification result data describing the first data from the first portion of the memory array and a second verification result data describing second data from the second portion of the memory array.

In Example 16, the subject matter of Example 15 optionally includes the operations further comprising: writing, by the memory controller, the verification result data to a table at the memory array, the table comprising a first record including the first verification result data and a second record including the second verification result data; receiving, from the requesting device, a request to read the table; and responsive to the request to read the table, sending at least a portion of the verification result data from the table to the requesting device.

Example 17 is a non-transitory computer-readable medium comprising instructions thereon that, when executed by a memory controller of a managed NAND non-volatile memory device, cause the memory controller of a managed NAND non-volatile memory device to perform operations comprising: receiving, from a requesting device, a verification request, the verification request comprising an indication of a first portion of a memory array of the managed NAND non-volatile memory device, and a first known check value; applying an operation based at least in part on first data from the first portion of the memory array to generate a calculated check value; determining verification result data, the determining of the verification result data being based at least in part on the first known check value and the calculated check value; and returning the verification result data to a requesting device.

In Example 18, the subject matter of Example 17 optionally includes the returning of the verification result data to the requesting device comprising sending the verification result data to the requesting device, the sending being responsive to the verification request.

In Example 19, the subject matter of any one or more of Examples 17-18 optionally include the indication of the first portion of the memory array comprising a start address indicating a first location at the memory array and a stop address indicating a second location at the memory array.

In Example 20, the subject matter of any one or more of Examples 17-19 optionally include the operations further comprising: writing the verification result data to a location at a memory array of the managed NAND non-volatile memory device that is accessible to the requesting device; receiving, from the requesting device, a request to read the location at the memory array; and responsive to the request to read the location at the memory array, sending the verification result data to the requesting device.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The invention claimed is:

1. A system, comprising:

a managed NAND non-volatile memory device comprising:

a memory array; and a memory controller, the memory controller being programmed to perform operations comprising:

receiving a verification request from a requesting device, the verification request comprising an indication of a first portion of the memory array, and a first known check value;

applying an operation based at least in part on first data from the first portion of the memory array to generate a calculated check value;

determining verification result data, the determining of the verification result data being based at least in part on the first known check value and the calculated check value;

writing the verification result data to a location at the memory array of the managed NAND non-volatile memory device that is accessible to the requesting device; and sending the verification result data to the requesting device.

2. The system of claim 1, the sending of the verification result data being responsive to the verification request.

3. The system of claim 1, the indication of the first portion of the memory array comprising a start address indicating a first location at the memory array and a stop address indicating a second location at the memory array.

4. The system of claim 1, the operations further comprising receiving, from the requesting device, a request to read the location at the memory array, the sending of the verification result data to the requesting device being responsive to the request to read the location at the memory array.

5. The system of claim 1, the requesting device being a programming appliance, the operations further comprising:

receiving, by the managed NAND non-volatile memory device, the first data from the programming appliance; and writing the first data to the first portion of the memory array.

6. The system of claim 1, the verification request comprising indications of a plurality of portions of the memory array and a plurality of known check values, the indications of the plurality of portions of the memory array comprising the indication of the first portion of the memory array and an indication of a second portion of the memory array, the plurality of known check values comprising the first known check value corresponding to the first portion of the memory array and a second known check value corresponding to the second portion of the memory array.

7. The system of claim 6, verification result data comprising first verification result data describing the first data from the first portion of the memory array and a second verification result data describing second data from the second portion of the memory array.

8. The system of claim 7, the operations further comprising:

writing, by the memory controller, the verification result data to a table at the memory array, the table comprising a first record including the first verification result data and a second record including the second verification result data;

receiving, from the requesting device, a request to read the table; and responsive to the request to read the table, sending at least a portion of the verification result data from the table to the requesting device.

9. A method comprising:

receiving, by a memory controller of a managed NAND non-volatile memory device and from a requesting device, a verification request, the verification request comprising an indication of a first portion of a memory array of the managed NAND non-volatile memory device, and a first known check value;

applying, by the memory controller, an operation based at least in part on first data from the first portion of the memory array to generate a calculated check value;

determining, by the memory controller, verification result data, the determining of the verification result data being based at least in part on the first known check value and the calculated check value;

writing the verification result data to a location at the memory array of the managed NAND non-volatile memory device that is accessible to the requesting device; and sending the verification result data to the requesting device.

10. The method of claim 9, the sending of the verification result data to the requesting device being responsive to the verification request.

11. The method of claim 9, the indication of the first portion of the memory array comprising a start address indicating a first location at the memory array and a stop address indicating a second location at the memory array.

12. The method of claim 9, further comprising receiving, from the requesting device, a request to read the location at the memory array, the sending of the verification result data to the requesting device being responsive to the request to read the location at the memory array.

13. The method of claim 9, the requesting device being a programming appliance, further comprising:

receiving, by the managed NAND non-volatile memory device, the first data from the programming appliance; and writing the first data to the first portion of the memory array.

14. The method of claim 9, the verification request comprising indications of a plurality of portions of the memory array and a plurality of known check values, the indications of the plurality of portions of the memory array comprising the indication of the first portion of the memory array and an indication of a second portion of the memory array, the plurality of known check values comprising the first known check value corresponding to the first portion of the memory array and a second known check value corresponding to the second portion of the memory array.

15. The method of claim 14, verification result data comprising first verification result data describing the first data from the first portion of the memory array and a second verification result data describing second data from the second portion of the memory array.

16. The method of claim 15, further comprising:

writing, by the memory controller, the verification result data to a table at the memory array, the table comprising a first record including the first verification result data and a second record including the second verification result data;

receiving, from the requesting device, a request to read the table; and responsive to the request to read the table, sending at least a portion of the verification result data from the table to the requesting device.

17. A non-transitory computer-readable medium comprising instructions thereon that, when executed by a memory controller of a managed NAND non-volatile memory device, cause the memory controller of a managed NAND non-volatile memory device to perform operations comprising:

receiving, from a requesting device, a verification request, the verification request comprising an indication of a first portion of a memory array of the managed NAND non-volatile memory device, and a first known check value;

applying an operation based at least in part on first data from the first portion of the memory array to generate a calculated check value;

determining verification result data, the determining of the verification result data being based at least in part on the first known check value and the calculated check value;

writing the verification result data to a location at the memory array of the managed NAND non-volatile memory device that is accessible to the requesting device; and sending the verification result data to the requesting device.

18. The non-transitory computer-readable medium of claim 17, the sending of the verification result data to the requesting device being responsive to the verification request.

19. The non-transitory computer-readable medium of claim 17, the indication of the first portion of the memory array comprising a start address indicating a first location at the memory array and a stop address indicating a second location at the memory array.

20. The non-transitory computer-readable medium of claim 17, the operations further comprising receiving, from the requesting device, a request to read the location at the memory array, the sending of the verification result data to the requesting device being responsive to the request to read the location at the memory array.

* * * * *